Jan. 11, 1966  M. A. KRENZKE  3,228,550
COMPOSITE PRESSURE VESSEL
Filed Aug. 27, 1964  4 Sheets-Sheet 1

INVENTOR.
MARTIN A. KRENZKE

Jan. 11, 1966   M. A. KRENZKE   3,228,550
COMPOSITE PRESSURE VESSEL
Filed Aug. 27, 1964   4 Sheets-Sheet 3

INVENTOR.
MARTIN A. KRENZKE
BY *DHedges*
ATTY.
*Albert Hopp*
AGENT

Jan. 11, 1966   M. A. KRENZKE   3,228,550
COMPOSITE PRESSURE VESSEL
Filed Aug. 27, 1964   4 Sheets-Sheet 4

INVENTOR.
MARTIN A. KRENZKE
BY
ATTY.
AGENT

United States Patent Office 3,228,550
Patented Jan. 11, 1966

3,228,550
COMPOSITE PRESSURE VESSEL
Martin A. Krenzke, Rockville, Md., assignor to the United States of America as represented by the Secretary of the Navy
Filed Aug. 27, 1964, Ser. No. 392,662
14 Claims. (Cl. 220—3)
(Granted under Title 35, U.S. Code (1952), sec. 266)

This application is a continuation-in-part of patent application Serial No. 860,297, filed December 17, 1959.

The invention described herein may be manufactured and used by or for the Government of the United States of America for governmental purposes without the payment of any royalties thereon or therefor.

The present invention relates to a pressure vessel and more particularly to a novel pressure vessel and a method of making the pressure vessel.

In undersea operation, particularly at great depth, large hydrostatic pressures are encountered. For this reason in the past, submarine pressure hulls have been generally constructed of welded steel. There are two great disadvantages of construction of pressure vessels when high pressures are involved. First, the shell thickness becomes very large and thus the rolling and welding required in fabrication are extremely difficult. Secondly, the weight of the structure is often greater than desired. It has been proposed to use light high-strength materials such as titanium and aluminum and alloys thereof.

The unique pressure vessel of the present invention is a composite hollow body composed of an inner hollow body constituted of a pluarlity of physically unattached blocks abutting each other and held in place solely by means of a jacket surrounding the blocks and which has been placed in a state of residual tension.

In the construction of the pressure vessel of this invention, a composite hollow body is formed of an external jacket in which are placed a plurality of physically unattached blocks or segments which may have high strength-to-weight ratios or other desired physical characteristics. As part of the composite hollow body, the jacket provides longitudinal strength to resist bending movements. The jacket also provides watertight integrity and resistance to corrosion. The function of the blocks or segments is to resist the major portion of compressive forces due to the pressure load, such as that due to external hydrostatic pressure. By way of examples, the shape of the composite hollow body may be spherical, cylindrical, oblong, irregular, or any suitable shape depending upon the use intended.

In fabricating the composite body according to one version of the invention, assuming that the desired shape is, for purposes of illustration only, cylindrical, a plurality of rings or segments thereof are arranged in an unconnected stacked fashion in close fit inside of a jacket. The ends of the jacket are sealed in any suitable manner, as for example, by hemispherical bodies. The resulting hollow body is then subjected to increasing external pressures, for example, by submergence in water.

During initial stages of pressure build-up, the jacket is elastically deformed inwardly, and if there is no initial gap between jacket and inner segments, the jacket and inner segments share in resisting the radial load due to the applied external pressure. As long as there is a gap, the jacket resists all radial loading. Eventually the applied presure reaches a point at which the elastic limit of the jacket is exceeded, and the jacket material undergoes plastic flow and, neglecting strain-hardening, resists no additional load.

Concurrently, the additional load on the composite body due to external pressure is no longer taken up by the jacket but is taken up by the inner segments, which are elastically deformed inwardly.

After reaching a predetermined pressure loading which is less than collapse-pressure, the external pressure is then released. During this decompression phase, the materials of the inner segments and jacket act together. The particular manner in which the jacket and segments coact depends on the "compatibility" of the respective materials. By the term "compatibility" is meant the relation between yield points and moduli of elasticity of the jacket and segment materials and the effect of this relation when the jacket and segments are subjected to pressure, then decompression.

As one example, reference is made to the generalized explanatory graphs of FIGS. 1, 2 and 3, each of which shows a plot of Y-axis stress versus X-axis static pressure acting on the jacket (curve 1) and the inner segments (curve 2) respectively. In the example of FIG. 1, the jacket (which may be steel) has a higher modulus of elasticity than the segments (which may be titanium alloy) while the segments have a higher yield point. It is also assumed that there is no clearance or a slight clearance, between the jacket and segments, but not enough clearance to enable the Baushinger effect to take place.

As shown in FIG. 1, the jacket (curve 1) takes up all of the radial loading until point A, which is reached at a relatively low applied external pressure, and additional loads are shared by the jacket and inner segments. As the jacket reaches its yield point at B, and between at least points B and C, and further pressure is applied, the jacket material transmits all additional pressure load to the segment material.

Upon release of the applied pressure (point C), the jacket material returns along curve 1 which is steeper than return curve 2 because of the jacket's higher modulus of elasticity.

Meanwhile, the segment material which never did reach its yield point along curve 2, returns elastically upon decompression (as indicated by the arrow along its return curve 2).

At zero applied pressure, the jacket material is in a state of residual tension while the segments are in a state of residual compression. This means that the jacket holds the segments together. The essentially same result may be obtained if the jacket is preshrunk on the segments.

Suppose, however, that the jacket and segment materials have the same modulus of elasticity, such as, for example, in the case where a titanium jacket encloses segments of high strength titanium. An example of how such materials may be compatible is shown in the graph of FIG. 2. The FIG. 2 is a plot of the same quantities as FIG. 1.

Assuming no initial clearance between jacket and segments, as the pressure is initially applied, both the jacket and the segments follow the same elastic deformation curve (jacket curve 1 superimposed on segment curve 2). The jacket passes its yield point at point A and continues to yield at the same stress as the pressure is increased, but the segments are stressed at an increased rate because they are now carrying all the additional load.

At point B, the pressure is released and the stress in the jacket and segments follows respective pressure stress curves 1 and 2. At zero pressure, there is residual tension in the jacket and slight residual compression in the segments. These residual forces coact so that the jacket holds the segments tightly together. The composite body acts to resist both bending moments and compressive forces.

As yet another example of compatibility, the graph of FIG. 3 illustrates the situation where the jacket material has a yield strength and modulus of elasticity greater than those of the inner segments.

As an illustration but not a limitation, the jacket material in such a case may be steel and the material of the inner segments may be aluminum. In some respects, FIG. 3 resembles FIG. 1, except that in FIG. 3 curve 1 representing stress on the jacket indicates a greater amount of external pressure that is applied to the jacket before the inner segments take up all of the additional pressure loading at yield point A. Sufficient additional loading (from point A to point B) places the inner segments in sufficient elastic compression so that when the pressure is released, the jacket (having the higher modulus of elasticity) returns along steeper curve 1 to a point at zero applied pressure of residual tension which holds the inner segments tightly together in residual compression.

From the foregoing examples of the present invention it can be appreciated that the jacket and segment materials may be regarded as compatible when during the composite body-forming cycle of compression of the jacket and segments, the jacket plastically flows while the segments are elastically deformed to such an extent that upon release of the pressure, the jacket and segment materials are resultantly in residual tension and compression respectively. It is not necessary that the respective jacket and segment materials be different or that they have different moduli of elasticity or different yield strengths.

It is therefore, an object of the present invention to provide a novel composite pressure vessel in which physical attachment of the elements thereof prior to treatment is unnecessary.

Another object of the present invention is to provide a type and method of pressure vessel construction which permits the use of non-weldable materials which are not practical to machine.

It is another object of the present invention to eliminate the necessity of welding thick sections in constructing pressure vessels.

A further object is a pressure hull construction which permits the use of assembly line methods to thereby reduce time as well as cost of construction.

Still another object of the present invention is the provision of a method of fabrication of pressure vessels which have high strength to weight ratios.

Other objects and many of the attendant advantages of this invention will be readily appreciated as the same become better understood by reference to the following detailed description when considered in connection with the accompanying drawings in which like reference numerals designate like parts throughout the figures thereof and wherein.

Figure 4:
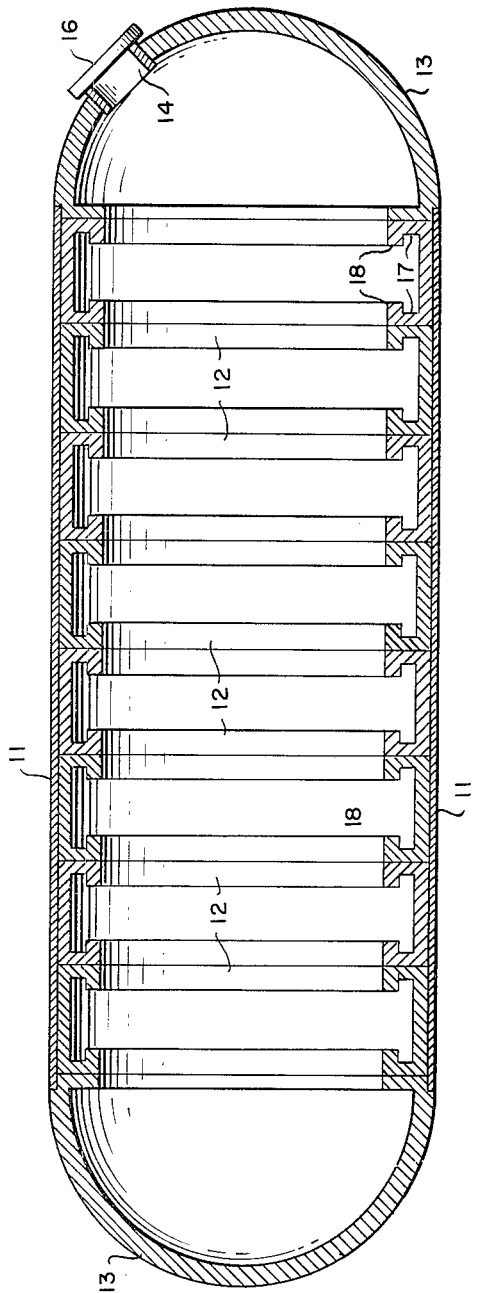
FIG. 4 is a sectional view taken along the axis of the hull of an oceanographic research vessel made in accordance with one version of the present invention.

Referring now to the drawings, wherein like reference characters designate like or corresponding parts throughout the views, there is shown in FIG. 4 a hull made of jacket and inner segment materials having respectively different yield strength and Young's moduli of elasticity. The hull of FIG. 4 is composed of a jacket 11 which is cylindrical in shape and may be made of rolled and welded sheets of metal. Inside cylindrical jacket 11 are a plurality of ring segments 12 which are shown in detail in FIG. 5 and which are arranged adjacent one another along the entire length of the jacket. The segments 12 may be held in place by gravity alone. At each end of the cylinder is fitted a dome 13 which forms the ends of the pressure vessel.

Figure 5:
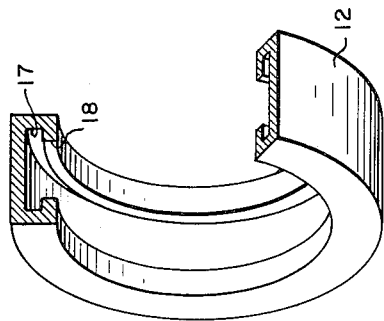
FIG. 5 is a view partly in section of one of the internal hull segments shown in FIG. 1.

The vessel hull shown in FIGS. 4 and 5 is designed for use as an oceanographic research vessel for exploration of the ocean bottom at great depths. There is provided an access hatch 14 in one of the domes 13. A cover 16 is fitted over and preferably hinged to the hatch 14 and is used to provide access to the interior of the hull. Cover 16 may be made of transparent material to allow observation. It will be realized that a plurality of transparent observation windows may be provided in the domes.

It will also be realized that holes may be provided in the domes for steering mechanism and propulsion shafts. The construction of these openings is conventional and forms no part of the present invention.

In constructing the pressure hull shown in FIG. 4, the first step is forming the jacket 11 into cylindrical form then welding the sheets together. As can be seen in the figure, the jacket is constructed of relatively thin material so that welding is greatly facilitated. As an illustration, and not a limitation, the material used for the jacket may be a steel having a yield strength of approximately 80,000 pounds per square inch. This steel has a value of Young's modulus of approximately $30 \times 10^6$ pounds per square inch.

Figure 1:
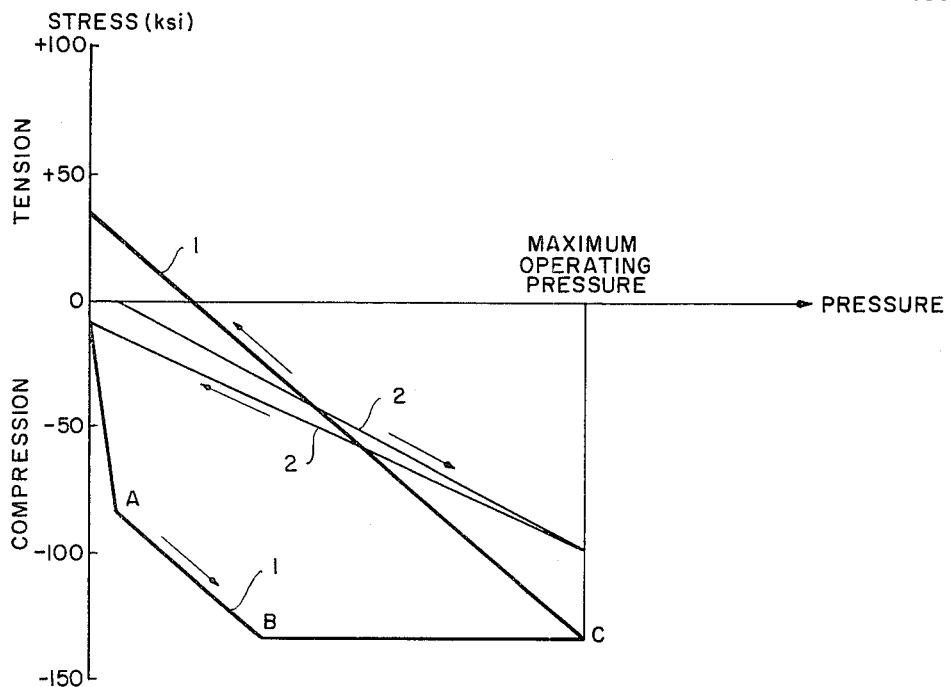
FIGS. 1, 2 and 3 are graphs previously referred to for explaining the principles of the present invention.
Figure 2:
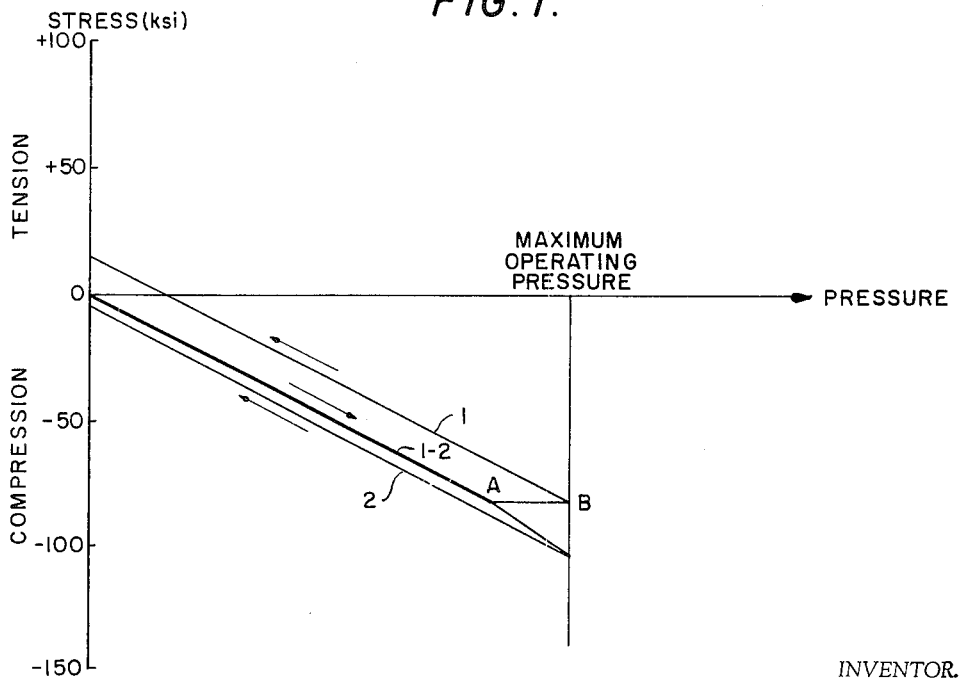
Figure 3:
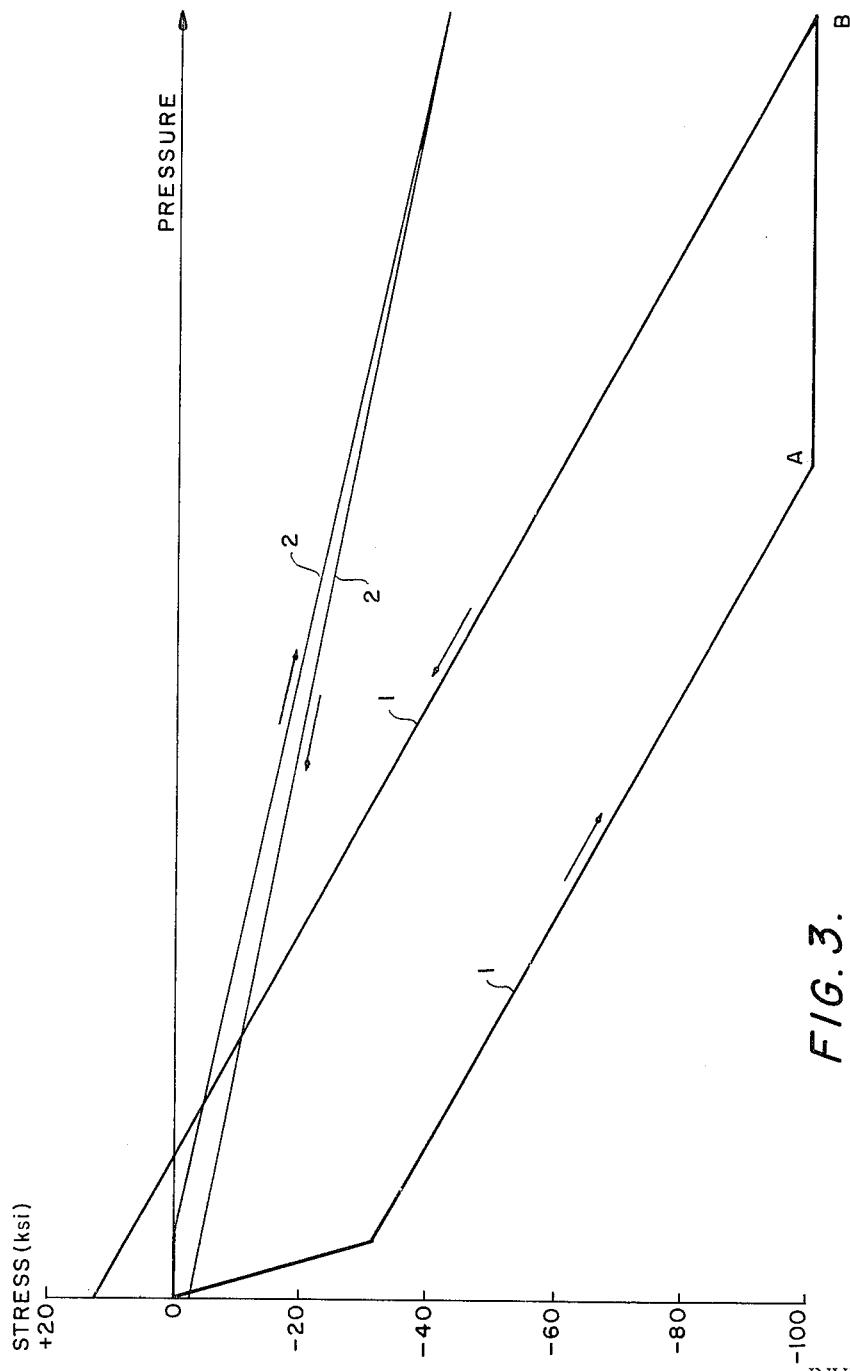

Inside the steel jacket are placed in end to end relationship a series of aluminum rings. The rings are not physically attached to each other. These rings may be of either machined, cast, or rolled construction. Aluminum having a yield strength of approximately 70,000 pounds per square inch with the Young's modulus of approximately $10 \times 10^6$ pounds per square inch has been found compatible for use with a steel jacket along the lines exemplarily illustrated in FIG. 3.

Dome shaped ends 13, preferably hemispherical in shape and which may be provided with access and observation hatches and propeller shaft openings are fitted onto the ends of the cylindrical structure in contact with the ends of the outer two rings of the aluminum and are permanently welded to the steel jacket. As shown in FIG. 4, the ends are of solid steel construction. However, it will be realized that these two may be of aluminum abutting the aluminum segments when fitted into the end of the steel jacket covering the aluminum segments, and likewise may be welded to the cylindrical steel jacket.

When all of the rings are in place and the ends are attached to the steel jacket in bearing relationship to the rings, the device is subjected to large external pressures by submergence under water. The pressure is regulated so that the steel outer jacket is caused to be stressed beyond its yield point but the yield point of the inner segments has not yet been reached. The pressure is then removed and as this initial load is released, the predetermined difference in Young's modulus and yield strength establishes the condition in which the aluminum tends to expand more than the steel and therefore puts the steel jacket in residual or prestressed tension. This prestressing locks the aluminum segments in place even when no external loads are applied. It will be realized that the thickness of the inner segments depends upon the amount of pressure for which the vessel is being designed. Webs 17 and flanges 18 may be provided for added structural strength without the addition of large amounts of additional weight.

Instead of forming the segments with a flange and web as shown in the figures, it may be desirable in some instances to use segments of constant thickness in abutting relationship with an I-beam shaped support abutting the inside of the joint along the length thereof. Segments of different shapes in overlapping relationships might also be used for this purpose. In this manner only half of the segments need to be machined or cast, the other half consisting merely of rolled stock. The domes 13 bear against the ends of the outer aluminum sections and tend to compress them thus holding them longitudinally in place.

Figure 6:
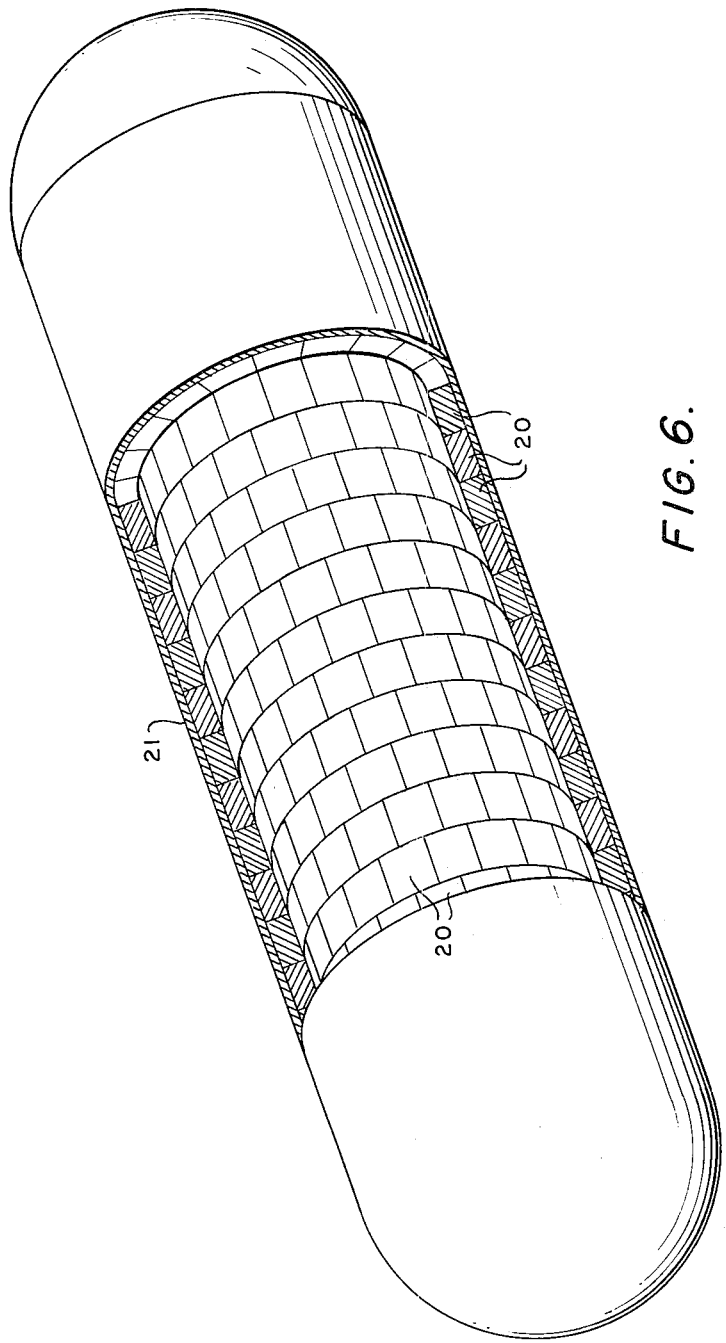
FIG. 6 is a view in perspective of a vessel made in accordance with another version of the present invention.

Reference is now made to FIG. 6 in which inner segments in the form of curved blocks 20 having inwardly tapering sides are arranged inside a cylindrical jacket 21. Each of the blocks 20 abut the jacket 21 and the blocks abut each other. As shown in FIG. 6 the blocks may be arranged in brick-like fashion, each course thereof defining a ring of abutting but physically unattached segments.

It is to be understood that FIG. 6 is only exemplary and that a jacket of any suitable shape may be employed in conjunction with blocks of varying or constant size shaped to abuttingly fit therein to define a hollow body to be formed into a composite unitary body in accordance with the invention. For example, an ellipsoid jacket may be provided with an inner body formed of abutting blocks of different sizes and shapes; a spherical body may have geodesic blocks or circular rows of blocks of the same size and shape in each row, but differing in size and shape from row to row with a large "lid" type block at one end. The blocks may be stacked in "igloo" fashion that is, overlappingly. Also, plastic material may be inserted between the blocks for achieving better fit and for minimizing the chance of cracking in the blocks when pressure loaded.

It will be realized that although the invention has been described in relation to certain named materials, various other materials may be used as desired. For example, a steel jacket may be used in conjunction with steel inner segments. Or, a metal jacket (e.g. steel, titanium) may be employed with glass or ceramic or glass reinforced plastic inner segments. It is not necessary that the jacket be of a "weldable" material because jackets made by other methods such as forging and extruding may be used.

If the differences in Young's modulus and yield strength of the materials used is sufficient to allow construction as previously described the vessel may be constructed in that manner. However, if the initial conditions and the physical characteristics of the materials are such that fabrication of the device in this manner is not practical, shrink-fit methods of fabrication may be used wherein the outer shell or jacket 11 is heated and segments 12 having a slightly larger external diameter than the inner diameter of the cold jacket are placed inside the jacket while the jacket is heated. The device is then allowed to cool causing contraction of the outer jacket and the segments are held in place with the jacket being in tension as previously described. This type of construction could be used, for example, when a high strength non-weldable steel segment is to be placed inside a weldable steel jacket. The shrink-fit type of construction may also be accomplished in some instances merely by the contraction of the weld as it cools.

It is understood that the blocks or segments composing the inner hollow body are held together at essentially atmospheric pressures by the tension of the jacket acting thereon. When the composite body is subjected to higher external pressure, such as a pressure which exerts a force on the inner body greater than the force imposed thereon by the pre-tensioned jacket, the force due to that higher external pressure serves to act on the inner body to hold the blocks or segments thereof together. Where blocks are used to form the inner hollow body, it is, of course necessary that the blocks be inwardly tapered so that each block acts as a keystone.

Although the present invention has been described for use in eliminating the necessity of welding the basic structural elements it will be realized that the invention may also be utilized to provide a protective covering where corrosion or other deterioration is involved, for example, a jacket of material which does not corrode may be placed over structural elements which if exposed to sea water might deteriorate in a short time. It should be understood therefore that the invention is not limited to an oceanographic research vessel but may also be used in various other devices which are required to withstand external forces. It will also be realized that various materials may be used in the construction. Since many modifications and variations of the present invention are possible in the light of the above teachings, it is therefore to be understood that within the scope of the appended claims the invention may be practiced otherwise than as specifically described.

What is claimed is:

1. A hollow composite pressure vessel comprising:
    a hollow jacket member having an opening therein;
    said jacket member being made of a material having a preselected yield point and modulus of elasticity and being in residual tension;
    a hollow body member having substantially the same configuration as said jacket member carried within said member;
    said hollow body member being comprised of a plurality of curved and unattached blocks with the peripheries of said blocks abutting the inner periphery of said jacket member;
    said curved blocks having tapered end walls and being arranged in side-by-side and end-to-end relationship to form said body member with the opposing side walls and opposing tapered end walls of said blocks being in abutment;
    said blocks being made of a material having a preselected yield point and modulus of elasticity and being in residual compression; and
    means carried by said jacket member for sealing the opening therein;
    the residual tension in said jacket member being operable to place said blocks in said hollow body member in compression and thereby hold said blocks in assembled engagement;
    said composite pressure vessel being capable of resisting both bending forces and compressive loads.

2. A hollow composite pressure vessel as claimed in claim 1 wherein the material of the jacket member has a higher modulus of elasticity than the material of the blocks and wherein the material of the blocks has a higher yield point than the material of the jacket member.

3. A hollow composite pressure vessel as claimed in claim 2 wherein said jacket member is made of steel and said blocks are made of a titanium alloy.

4. A hollow composite pressure vessel as claimed in claim 1 wherein the material of the jacket member and the material of the blocks both have the same modulus of elasticity.

5. A hollow composite pressure vessel as claimed in claim 4 wherein the jacket member and the blocks are made of high strength titanium.

6. A hollow composite pressure vessel as claimed in claim 1 wherein the material of the jacket member has both a yield strength and a modulus of elasticity greater than the yield strength and the modulus of elasticity of the material of the blocks.

7. A hollow composite pressure vessel as claimed in claim 6 wherein the jacket member is made of steel and the blocks are made of aluminum.

8. A hollow composite pressure vessel comprising:
    a hollow substantially cylindrical jacket member having open ends;
    said jacket member being made of a material having a preselected yield point and modulus of elasticity and being in residual tension;
    a hollow substantially cylindrical body member carried within said hollow jacket member;
    said body member being comprised of a plurality of curved and unattached blocks with the outer peripheries of said blocks abutting the inner periphery of said jacket member;
    said curved blocks having tapered end walls and being arranged in side-by-side and end-to-end relationship to form said body member with the opposing side walls and opposing tapered end walls of said blocks being abutment;
    said blocks being made of a material having a preselected yield point and modulus of elasticity and being in residual compression; and dome means carried within the open ends of said jacket member and said body member;

the residual tension in said jacket member being operable to place said blocks in compression and thereby hold said blocks in assembled engagement with said jacket member;

said body member in function resisting most of the compressive forces when said pressure vessel is exposed to high external pressures;

said composite pressure vessel being capable of resisting both bending forces and compressive loads.

9. A hollow composite pressure vessel as claimed in claim 8 wherein the material of the jacket member has a higher modulus of elasticity than the material of the blocks and wherein the material of the blocks has a higher yield point than the material of said jacket member.

10. A hollow composite pressure vessel as claimed in claim 9 wherein the jacket member is made of steel and the blocks are made of a titanium alloy.

11. A hollow composite pressure vessel as claimed in claim 8 wherein the material of the jacket member and the material of the blocks both have the same modulus of elasticity.

12. A hollow composite pressure vessel as claimed in claim 11 wherein the jacket member and blocks are both made of high strength titanium.

13. A hollow composite pressure vessel as claimed in claim 8 wherein the material of the jacket member has both a yield point and a modulus of elasticity greater than that of the material of the blocks.

14. A hollow composite pressure vessel as claimed in claim 13 wherein the jacket member is made of steel and the blocks are made of aluminum.

References Cited by the Examiner
UNITED STATES PATENTS

| | | | |
|---|---|---|---|
| 411,838 | 10/1889 | Springer | 220—63 |
| 446,041 | 2/1891 | Wagg | 220—63 |
| 1,888,039 | 11/1932 | Huff. | |
| 2,114,640 | 4/1938 | Rumbarger et al. | 220—63 |
| 2,337,247 | 12/1943 | Kepler | 29—421 |
| 2,360,391 | 10/1944 | Birchall | 220—3 |
| 2,480,369 | 8/1949 | Jasper | 29—446 |
| 2,609,595 | 9/1952 | Rosshein | 29—517 |
| 2,669,209 | 2/1954 | Hoffman | 29—421 |
| 2,988,240 | 6/1961 | Hardesty | 220—3 |
| 3,009,484 | 11/1961 | Dollens | 29—516 |
| 3,029,966 | 4/1962 | Reynolds | 114—16 |
| 3,041,717 | 7/1962 | Brown | 29—446 |

THERON E. CONDON, *Primary Examiner.*

R. H. SCHWARTZ, *Assistant Examiner.*